Figure 1:
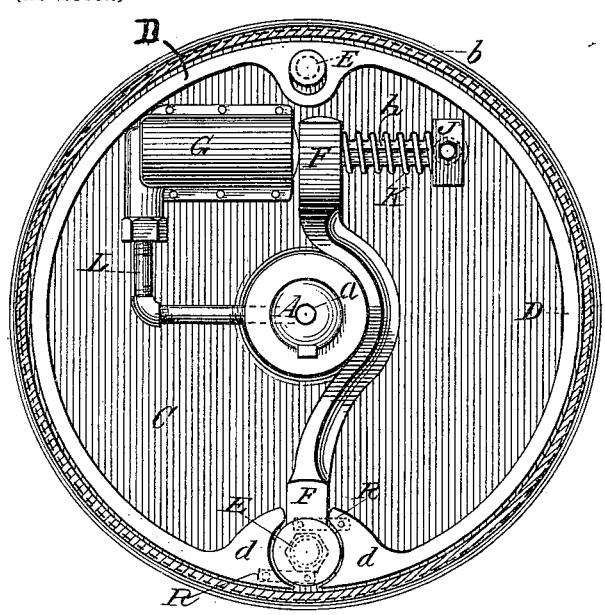

No. 663,396. Patented Dec. 4, 1900.
E. F. STONE.
FRICTION CLUTCH.
(Application filed Nov. 11, 1899.)
(No Model.) 2 Sheets—Sheet 1.

Witnesses:
J. G. Daly.

Inventor:
Edward F. Stone,
by A. N. Beecher
Atty.

THE NORRIS PETERS CO., PHOTO-LITHO., WASHINGTON, D. C.

No. 663,396. Patented Dec. 4, 1900.
E. F. STONE.
FRICTION CLUTCH.
(Application filed Nov. 11, 1899.)

(No Model.) 2 Sheets—Sheet 2.

Witnesses:
J. J. Daly.

Inventor:
Edward F. Stone,
by ...
Atty

UNITED STATES PATENT OFFICE.

EDWARD F. STONE, OF BOSTON, MASSACHUSETTS.

FRICTION-CLUTCH.

SPECIFICATION forming part of Letters Patent No. 663,396, dated December 4, 1900.

Application filed November 11, 1899. Serial No. 736,590. (No model.)

*To all whom it may concern:*

Be it known that I, EDWARD F. STONE, of Boston, in the county of Suffolk, State of Massachusetts, have invented certain new and useful improvements in Friction-Clutches, of which the following is a specification.

This invention relates to the class of friction-clutches and clutch-couplings for shafting in which an elastic ring transversely severed at one or more points is mounted upon a carrying-plate and forced outwardly into frictional engagement with the encircling flange of the clutch body or pulley to be actuated. Clutches have heretofore been made having such severed ring so mounted and enlarged into clutching contact with the annular flange by means of a vibrating lever actuated from without the clutch or pulley by devices having a sliding movement upon the shaft carrying said pulley; but such apparatus is complicated and unsightly and occupies unnecessary space on the shaft. In my apparatus I expand the severed ring by a lever mechanism inclosed within the body of the pulley, and I actuate such mechanism by fluid-pressure acting within the clutch-body and the shaft upon which it is mounted, thereby dispensing with external sliding clutch-actuating mechanism, the fluid under pressure being admitted and discharged through a running joint and a suitable cock or valve.

My invention comprises a pulley or clutch body mounted on a tubular or axially-perforated shaft and having an annular flange with a smooth internal surface concentric with said shaft, a carrying-plate forming one side of the clutch-body and a transversely-severed elastic ring mounted on such carrying-plate within said flange, in combination with a lever mounted on such carrying-plate and acting between the shoulders of said ring where severed, and with means for applying fluid-pressure to the free end of said lever within the clutch-body. The preferred means for applying such pressure to the lever comprises a movable piston connected to said lever and inclosed within a chamber secured to the carrying-plate and having a tubular connection with the axis of the shaft for the admission and discharge of the operating fluid. A spring may also be provided to reverse the movement of the lever when the fluid-pressure is cut off and the clutch members are to be disengaged. The ends of the severed ring may be linked to the foot of the lever, so as to positively relieve such ring from its engagement with the pulley-flange when the lever is retracted. The fluid giving the required pressure is admitted to the interior of the shaft by a suitable running joint. Compressed air, steam, gas, or water will be employed to effect this pressure, as may be preferred. The carrying-plate will be keyed to the shaft and will be properly balanced.

Figure 3:
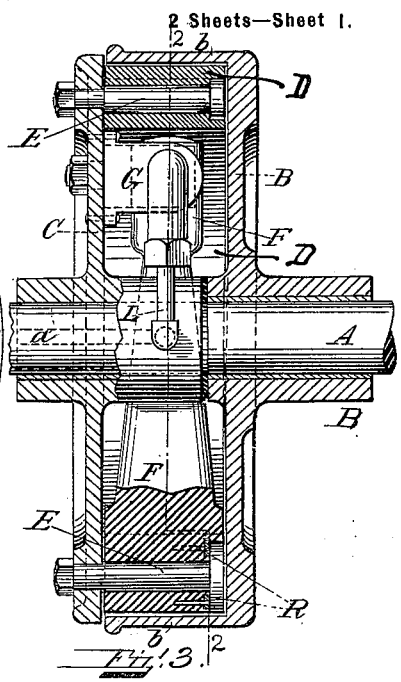
Figure 2:
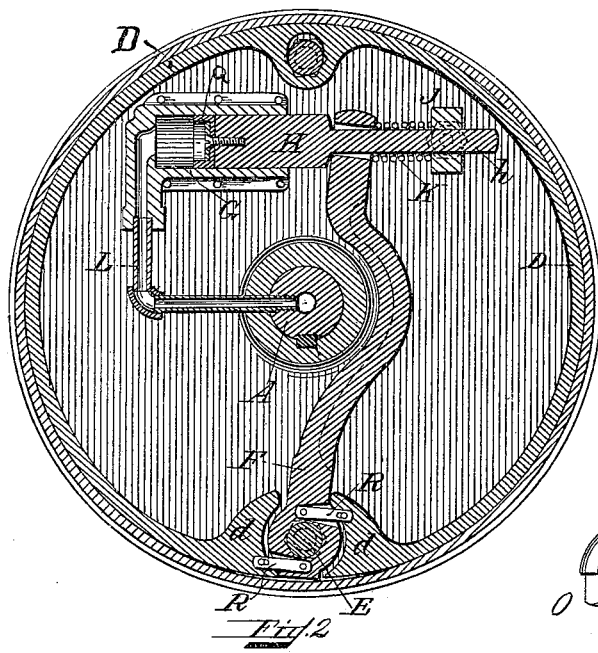
Figure 4:
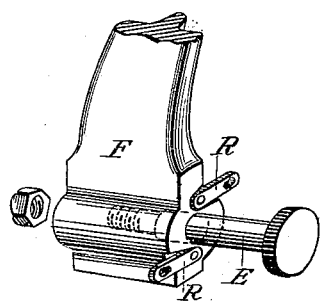
Figure 5:
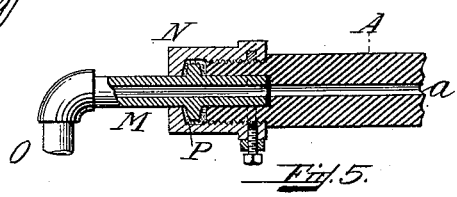
Figure 6:
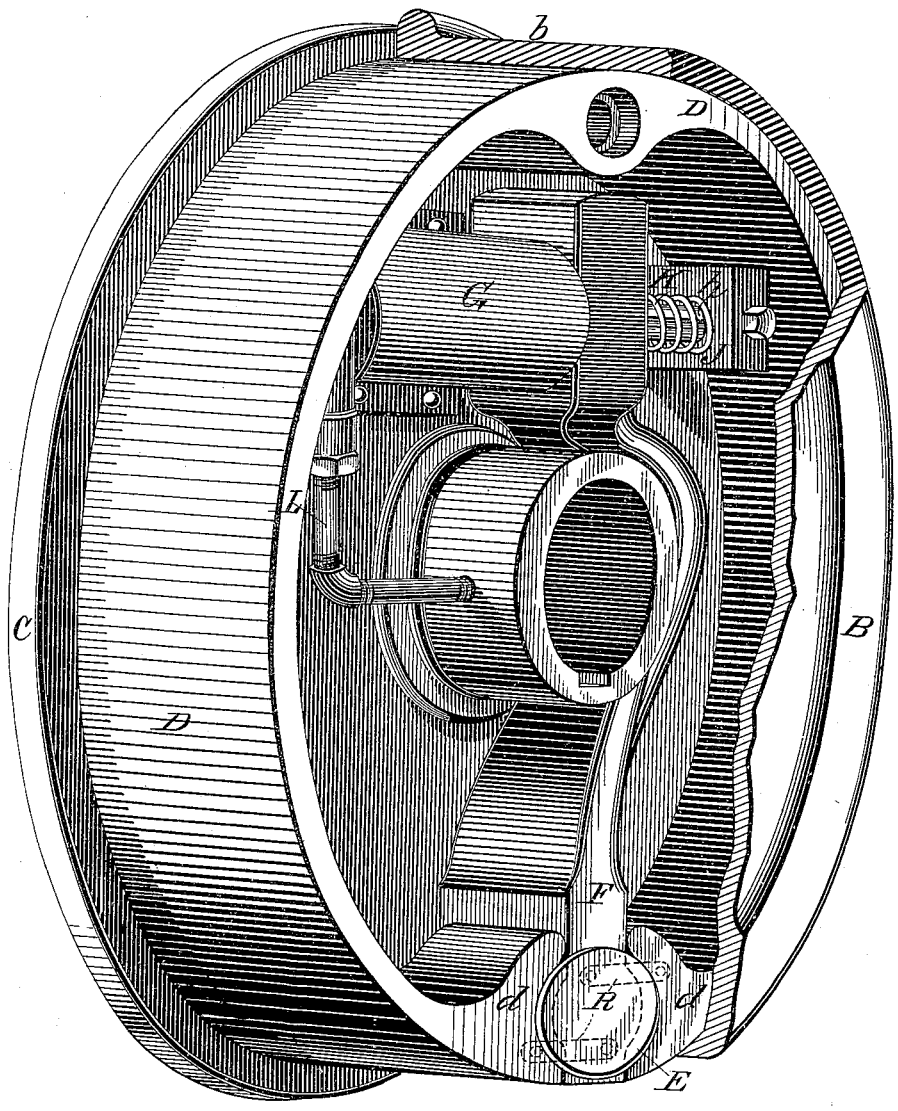

In the drawings, Figure 1 is an elevation of my clutch mechanism, showing the flange of the clutch-body in section, the vertical face or radial portion of such body being removed to show the interior construction and the spring being relaxed and free from contact with said flange. Fig. 2 is a transverse section through the shaft and clutch apparatus on the line 2 2 of Fig. 3 and showing the severed ring expanded into clutching contact with the inclosing flange. Fig. 3 is an axial section through the clutch mechanism, the shaft and some parts being in elevation. Fig. 4 is a detail in perspective of the base of the vibrating lever, and Fig. 5 a detail illustrating a form of running joint for admission of the fluid. Fig. 6 is an enlarged sectional perspective view of the apparatus, the clutch being broken away to show the interior.

A represents the tubular or axially-perforated shaft on which the clutch is mounted, and *a* the perforation therein.

B is the clutch-body mounted for free rotation on the shaft and formed with the annular peripheral flange *b*.

C is the carrying-plate keyed to the shaft for constant rotation with it and forming one side of the clutch and coöperating with the clutch-body B to inclose the other parts of the apparatus.

D is the transversely-severed elastic ring mounted on the carrying-plate C, to which it is anchored by substantial studs or bolts E. The ring D is located just within and normally free from contact with the inclosing flange *b* of the clutch-body, with which it is to be brought into clutching contact.

F represents the vibrating lever pivoted at foot upon one of the studs E between the shoulders *d* of the ring D.

G represents a piston-chamber formed on or secured to the inner face of the carrying-plate C. H is a piston moving within said chamber and projecting therefrom and engaging endwise or by its stem $h$ with the free end of the lever F, which it serves to actuate when fluid is admitted to the chamber G. The stem $h$ has a limited reciprocating movement through a lug J on the carrying-plate, and a spring K is interposed between said lug and the free end of the lever F to restore the lever and piston to their normal position when the fluid-pressure is withdrawn.

L represents a tube leading from the axis of the shaft A to the chamber G and constituting a passage for the fluid under pressure from the interior of the shaft to and from said chamber, the parts being inclosed within the clutch apparatus. The head of the piston is provided with a suitable cupped packing Q to prevent leakage of the fluid at that point. (See Fig. 2.)

The fluid for actuating the clutch mechanism will be admitted to the axis of the shaft by a suitable running joint permitting the rotary movement of the shaft. Fig. 5 illustrates a simple connection for the purpose, a shouldered non-rotary tube M, of antifriction metal, being introduced into a cap N, which screws upon the end of shaft A, a suitable packing P being introduced at the shoulder of the tube M between the cap and the end of the shaft. Tubular connections O extend to the source of supply of the fluid under pressure, the admission and discharge of said fluid being controlled by a suitable cock or valve. The running joint may be otherwise arranged to admit the fluid without leakage at the joint.

The foot of the lever F is shown connected by links R with the shoulders $d$ of the ring D, so that when the lever is retracted to release the clutch the ring will be drawn positively out of contact with the inclosing flange $b$, thus counteracting any centrifugal or other tendency of the ring to cling to the flange.

In Figs. 1 and 6 the stem $h$ of the piston H is shown as formed with a longitudinal groove to receive the tip of a pin or screw and keep the piston from rotation, while allowing it to move longitudinally.

I claim as my invention—

1. In a friction-clutch mechanism, an axially-perforated shaft, a clutch-body having an annular peripheral flange with a smooth inner surface concentric with said shaft, a radial carrying-plate fixed on the shaft and a transversely-severed elastic ring anchored on said plate, within said flange, in combination with lever mechanism and a cylinder and piston connected thereto inclosed between said body and plate and serving to expand said ring into clutching contact with the flange, and with a tubular connection to said shaft and from it to said mechanism, within the clutch, whereby the clutch is actuated by fluid-pressure through said shaft and tubular connections, substantially as set forth.

2. In a friction-clutch mechanism, an axially-perforated shaft, a flanged clutch-body freely rotatable on the shaft, a carrying-plate fixed on said shaft and coöperating with the clutch-body, and a transversely-severed elastic ring anchored on such carrying-plate, in combination with a lever pivoted on said plate between the shoulders of the severed ring, a cylinder fixed on said plate and a piston moving therein, and with tubular connections from the interior of the shaft to the piston connected to the free end of said lever, between the clutch-body and the carrying-plate, and serving to actuate said lever and expand the ring into clutching contact with said flange, substantially as set forth.

3. In a friction-clutch mechanism, an axially-perforated shaft, a flanged clutch-body loosely mounted thereon, a carrying-plate fixed on said shaft, a piston-chamber fixed on such plate, tubular connections from said chamber to the interior of the shaft, and a piston movable in such chamber and projecting at one end therefrom, in combination with a transversely-severed ring anchored on said plate, and a vibrating lever pivoted on such plate, between the terminal shoulders of said ring, and, at its free end, connected to said piston, and adapted to be actuated by fluid-pressure exerted within the clutch through such tubular connections, substantially as set forth.

4. In a friction-clutch mechanism, a flanged clutch-body and a carrying-plate, respectively loose and fixed on the shaft, a transversely-severed elastic ring, and a vibrating lever adapted to expand said ring into clutching contact with the flange of the clutch-body, in combination with a movable piston connected to the free end of said lever and actuated by fluid-pressure applied between such body and plate, and with a spring serving to restore said lever to its dormant position and release the clutch when the pressure is withdrawn, substantially as set forth.

In testimony whereof I have affixed my signature in presence of two witnesses.

EDWARD F. STONE.

Witnesses:
 A. H. SPENCER,
 J. G. DALY.